United States Patent
Lee et al.

(10) Patent No.: US 10,415,534 B2
(45) Date of Patent: Sep. 17, 2019

(54) GLOW PLUG FOR VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Joonhee Lee, Incheon (KR); Kyoung Min Lee, Hwaseong-si (KR); Kyoungchan Han, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 153 days.

(21) Appl. No.: 15/794,761

(22) Filed: Oct. 26, 2017

(65) Prior Publication Data

US 2018/0283346 A1    Oct. 4, 2018

(30) Foreign Application Priority Data

Apr. 4, 2017    (KR) .................. 10-2017-0043592

(51) Int. Cl.
*F02P 19/02*    (2006.01)

(52) U.S. Cl.
CPC .............. *F02P 19/021* (2013.01); *F02P 19/02* (2013.01); *F02P 19/028* (2013.01); *Y02T 10/125* (2013.01)

(58) Field of Classification Search
CPC ........ F02P 19/02; F02P 19/021; F02P 19/028; F02P 19/026; F02D 35/023; G01M 15/08; G01M 15/10; G01M 15/05; F02F 1/242; F02F 1/4285; F02B 23/02
See application file for complete search history.

(56) References Cited

U.S. PATENT DOCUMENTS

| 8,943,877 B2 | 2/2015 | Bruckner et al. |
| 2007/0209624 A1* | 9/2007 | Ludwig .................. F23Q 7/001 123/145 A |
| 2016/0102629 A1* | 4/2016 | Quix ...................... F02P 13/00 123/298 |

FOREIGN PATENT DOCUMENTS

JP    H06-288333 A    10/1994

* cited by examiner

*Primary Examiner* — George C Jin
(74) *Attorney, Agent, or Firm* — Morgan, Lewis & Bockius LLP

(57) ABSTRACT

A glow plug of a vehicle preventing an interference with an injected fuel includes a preheating rod having one end protruding to the combustion chamber to selectively preheat the combustion chamber; a bellows pipe enclosing the preheating rod to maintain an air-tightness of an area where the preheating rod is inserted to the combustion chamber; a piezo element selectively pulling or pushing another end of the preheating rod; and a controller controlling a deformation of the piezo element and the preheating of the combustion chamber through the preheating rod.

17 Claims, 3 Drawing Sheets

GLOW PLUG FOR VEHICLE AND CONTROL METHOD THEREOF

CROSS-REFERENCE TO RELATED APPLICATION

The present application is based on and claims the benefit of priority to Korean Patent Application No. 10-2017-0043592 filed on Apr. 4, 2017 with the Korean Intellectual Property Office, the entire contents of which are incorporated herein by reference.

TECHNICAL FIELD

The present disclosure relates to a glow plug of a vehicle and a control method. More particularly, the present disclosure relates to a glow plug preventing an interference with an injected fuel and a control method thereof.

BACKGROUND

Generally, a glow plug is a device for preheating a combustion chamber of a diesel engine.

In the diesel engine, since an ignition of fuel due to a compression heat of air occurs, when suddenly turning on an electric motor, the electric motor is not started. Therefore, after an inside of the combustion chamber is preheated to 800° C. or above by applying an electric current to the glow plug, the fuel is injected to perform an ignition of the engine and a starting of the electric motor. After operating a preheating switch before starting the electric motor, it is common that a driver confirms =that the preheating is completed when a warning lamp is turned off.

Recently, it became possible to instantaneously raise temperature of the combustion chamber with a metal glow device. However, in order to improve a fuel consumption rate and reduce harmful material of an exhaust gas, it may be difficult to avoid an interference between the glow plug protruded to the combustion chamber and the fuel due to an injection area increasing of the fuel in the combustion chamber through an injector multicomponent, etc.

The above information disclosed in this section is only for enhancement of understanding of the background of the disclosure and therefore it may contain information that does not form the prior art that is already known in this country to a person of ordinary skill in the art.

SUMMARY

The present disclosure has been made in an effort to provide a glow plug preventing an interference with the injected fuel in the combustion chamber and a control method thereof.

A glow plug of a vehicle preheating a combustion chamber of an engine according to an exemplary embodiment of the present disclosure includes a preheating rod having one end protruding to the combustion chamber to selectively preheat the combustion chamber; a bellows pipe enclosing the preheating rod to maintain an air-tightness of an area where the preheating rod is inserted to the combustion chamber; a piezo element selectively pulling or pushing another end of the preheating rod; and a controller controlling a deformation of the piezo element and the preheating of the combustion chamber through the preheating rod.

The preheating rod may be formed of a metal material to preheat the combustion chamber by receiving a current.

The bellows pipe may be formed of an elastic material to close the area where the preheating rod is inserted to the combustion chamber.

The piezo element may be deformed depending on a voltage applied to eh piezo element.

if the controller decreases the voltage applied to the piezo element, the piezo element may expand and may reach the another end of the preheating rod so that the one end of the preheating rod is protruded to the combustion chamber.

The bellows pipe may maintain an air-tightness while being contracted.

The controller may apply a current to the preheating rod, and the combustion chamber is preheated.

If the controller increases the voltage applied to the piezo element, the piezo element may be contracted to pull the another end of the preheating rod so that the one end of the preheating rod may be detached outside the combustion chamber. The controller may release the current applied to the preheating rod.

The bellows pipe may maintain the air-tightness while being expanded.

The glow plug of the vehicle according to an exemplary embodiment of the present disclosure may further include an insulating member disposed on a circumference of the piezo element to insulate the piezo element from a surroundings.

A control method of a glow plug including a preheating rod selectively protruding to a combustion chamber to preheat the combustion chamber of an engine and a piezo element deformed to pull or push the preheating rod according to an exemplary embodiment of the present disclosure includes measuring a temperature of a coolant, a temperature of an intake, and an outlet temperature of a turbine; protruding the preheating rod to the combustion chamber; and detaching the preheating rod outside the combustion chamber.

The control method may start at a Key On of the vehicle.

The control method may be finished at a Key Off of the vehicle.

If any one of the temperature of the coolant, the temperature of the intake, and the outlet temperature of the turbine does not reach each predetermined temperature, the preheating rod may be protruded to the combustion chamber depending on a deformation of the piezo element.

If the glow plug is protruded to the combustion chamber, a current may be applied to the preheating rod such that the combustion chamber may be preheated.

If all of the temperature of the coolant, the temperature of the intake, and the outlet temperature of the turbine reach each predetermined temperature, the preheating rod may be detached outside the combustion chamber depending on a deformation of the piezo element.

DETAILED DESCRIPTION

An exemplary embodiment of the present disclosure will hereinafter be described in detail with reference to the accompanying drawings.

Figure 1:
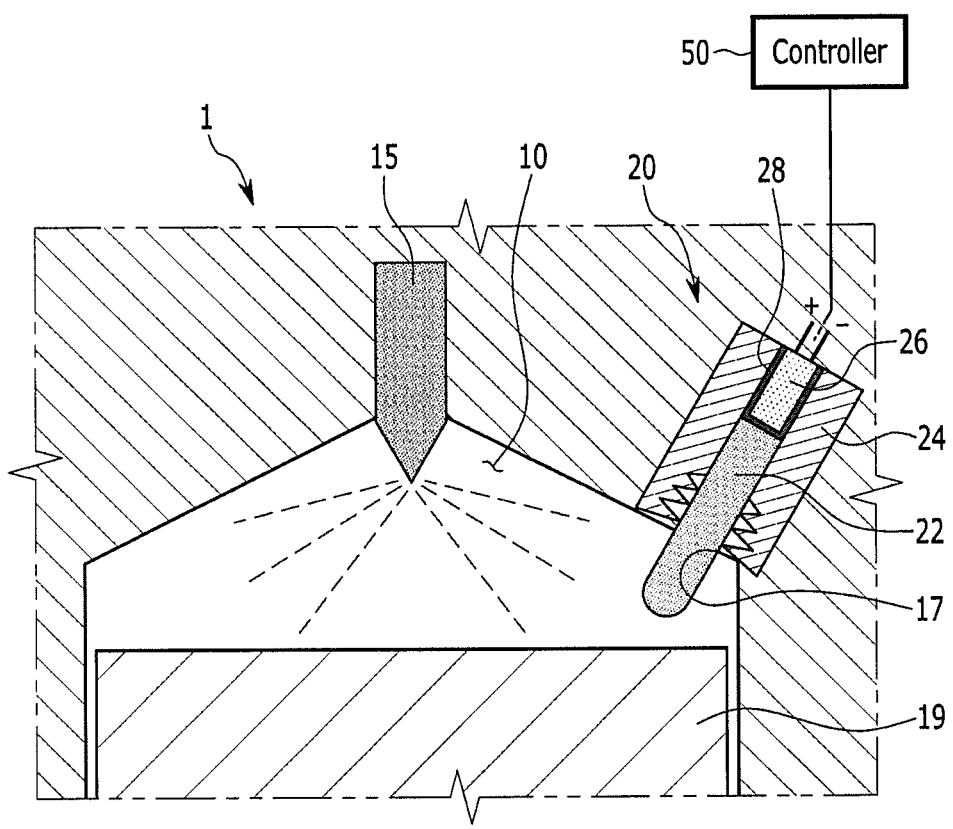
FIG. 1 is a schematic diagram of a glow plug according to an exemplary embodiment of the present disclosure.

FIG. 1 is a schematic diagram of a glow plug according to an exemplary embodiment of the present disclosure.

As shown in FIG. 1, the glow plug 20 according to an exemplary embodiment of the present disclosure is provided to preheat of a combustion chamber 10 of an engine 1 and includes a preheating rod 22, a bellows pipe 24, a piezo element 26, and an insulating member 28.

On the other hand, the combustion chamber 10 as a space that is formed between a piston 19 and a cylinder head inside a cylinder of the engine 1 and in which an ignition of the fuel is performed is obvious to a person having ordinary knowledge in the technical field (say, a person of an ordinary skill in the art) such that a detailed explanation thereof will be omitted.

The preheating rod 22 has one end selectively protruded to the combustion chamber 10. The preheating rod 22 receives a current, thereby functioning to preheat the combustion chamber 10. Furthermore, the preheating rod 22 may be a metal material having high thermal conductivity to be advantageous in preheating the combustion chamber 10. Furthermore, the preheating rod 22 may be a rod shape formed to be long in one direction such that it is easy to be protruded into the combustion chamber 10.

The bellows pipe 24 is provided to enclose the preheating rod 22. For example, if the preheating rod 22 is a cylindrical shape, the preheating rod 22 is inserted into a hollow of the bellows pipe 24, and the bellows pipe 24 is disposed to enclose an exterior circumference of the preheating rod 22. The bellows pipe 24 functions to maintain an air-tightness of an area where the preheating rod 22 is inserted to the combustion chamber 10. That is, the bellows pipe 24 prevents a gas of high pressure from being leaked between an insertion hole 17 formed to insert the preheating rod 22 to the combustion chamber 10 and the preheating rod 22. Furthermore, the bellows pipe 24 may be formed of a synthetic resin material having elasticity to close an area where the insertion hole 17 is formed. Here, a bellows shape mainly used when closing and sealing a fluid therebetween while allowing the fluid to flow in an axis direction is obvious to a person of an ordinary skill in the art such that a detailed explanation thereof will be omitted.

The piezo element 26 is provided to be in contact with the other end of the preheating rod 22 in the hollow of the bellows pipe 24. Here, the piezo element 26 generates a deformation in proportional to a voltage that is applied or generates the voltage by applying a pressure or a twist to a piezoelectric determination, and the piezo element 26 according to an exemplary embodiment of the present disclosure is deformed depending on the applied voltage.

The insulating portion 28 is disposed around the piezo element 26 so as to insulate the piezo element 26 from the surroundings.

FIG. 1 shows that one end of the preheating rod 22 is protruded to the combustion chamber 10 to perform preheating of the combustion chamber 10.

If the voltage applied to the piezo element 26 decreases, the piezo element 26 pushes the other end of the preheating rod 22 while being expanded in a length direction of the preheating rod 22. Accordingly, the one end of the preheating rod 22 is protruded to the combustion chamber 10 through the insertion hole 17, and the bellows pipe 24 maintains the air-tightness while being contracted. In this case, a current is applied to the preheating rod 22 such that the combustion chamber 10 is preheated. FIG. 1 schematically shows a positive pole (+) and a negative pole (−) of a power source applying the voltage and the current to the piezo element 26 and the preheating rod 22.

Figure 2:
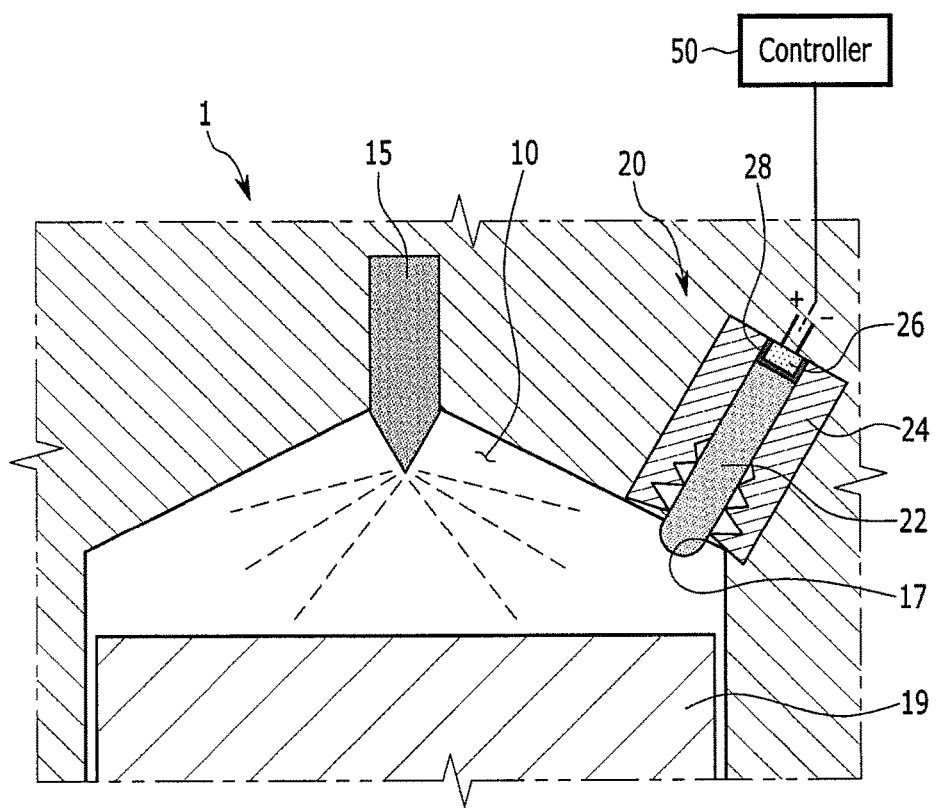
FIG. 2 is an operation view of a state that a glow plug according to an exemplary embodiment of the present disclosure does not perform a preheating of a combustion chamber.

FIG. 2 is an operation view of a state that a glow plug, according to an exemplary embodiment of the present disclosure, does not perform a preheating of a combustion chamber.

As shown in FIG. 2, if the voltage applied to the piezo element 26 increases, the piezo element 26 pulls the other end of the preheating rod 22 while being contracted in the length direction of the preheating rod 22. Accordingly, the one end of the preheating rod 22 is detached outside the combustion chamber 10 through the insertion hole 17 and the bellows pipe 24 maintains the air-tightness while being expanding. In this case, the current applied to the preheating rod 22 is released.

Figure 3:
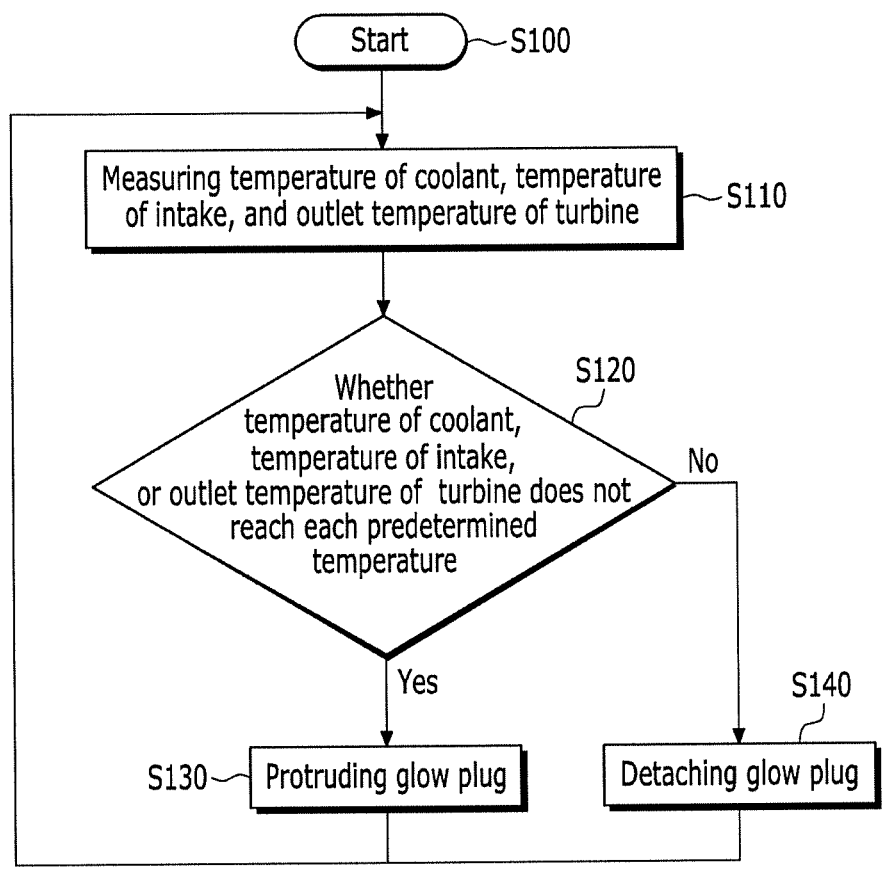
FIG. 3 is a flowchart of a control method of a glow plug according to an exemplary embodiment of the present disclosure.

FIG. 3 is a flowchart of a control method of a glow plug according to an exemplary embodiment of the present disclosure.

As shown in FIG. 3, if a control method of the glow plug 20 according to an exemplary embodiment of the present disclosure starts during a Key On of the vehicle (S100), the controller 50 measures a temperature of a coolant cooling the engine 1, a temperature of an air (intake) inhaled into the engine 1, and an outlet temperature of a turbine from which the air passing through the turbine of a turbo charger (not shown) flows out (S110). Here, the controller 50 may be an ordinary electronic control unit (ECU) that totally controls the control of the electronic equipment of the vehicle. Also, to perform these measuring by temperature sensors (not shown) disposed in each part is obvious to a person of an ordinary skill in the art.

In the step (S110), of the temperature of the coolant is less than predetermined coolant temperature, the temperature of the intake is less than a predetermined intake air temperature, and the outlet temperature of the turbine is less than a predetermined turbine temperature, as the controller 50 controls the voltage applied to the piezo element 26 to be decreased, the operation that the preheating rod 22 of the glow plug 20 is protruded to the combustion chamber 10 is performed (S130). Here, the predetermined coolant temperature, the predetermined intake air temperature, and the predetermined turbine temperature are a temperature predetermined by a person of an ordinary skill in the art. That is, if any one among the coolant temperature, the intake temperature, and the outlet temperature of the turbine does not reach the temperature predetermined by a person of an ordinary skill in the art, the operation that the preheating rod 22 of the glow plug 20 is protruded to the combustion chamber 10 is performed (S130). In other words, the operation that the preheating rod 22 of the glow plug 20 is protruded to the combustion chamber 10 is performed when the engine 1 is cold. In this case, the controller 50 applies the current to the preheating rod 22, and the combustion chamber 10 is preheated.

In the step (S110), if the coolant temperature is the predetermined coolant temperature or more, the intake temperature is the predetermined intake air temperature or more, and the outlet temperature of the turbine is the predetermined turbine temperature or more, as the controller 50 controls the voltage applied to the piezo element 26 to be increased, the operation that the preheating rod 22 of the glow plug 20 is released outside the combustion chamber 10 is performed (S140). That is, the operation that the preheating rod 22 of the glow plug 20 is released is performed when the engine 1 warms up. Accordingly, when the engine 1 warms up, the fuel supplied to the engine 1 is injected to the combustion chamber 10 without the interference with the preheating rod 22 by fuel injector 15. In this case, the controller 50 releases the current applied to the preheating rod 22.

On the other hand, the control method of the glow plug 20 according to an exemplary embodiment of the present disclosure may be finished at the Key Off of the vehicle.

As described above, according to an exemplary embodiment of the present disclosure, as the preheating rod 22 is protruded into the combustion chamber 10 only when the preheat of the combustion chamber 10 is required, in the state of the engine 1 in which the preheating of the combustion chamber is not required, the interference between the injected fuel of the combustion chamber 10 and the preheating rod 22 may be prevented. Accordingly, the fuel consumption of the engine may be improved and the preheat efficiency of the combustion chamber may increase.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A glow plug of a vehicle preheating a combustion chamber of an engine comprising;
    a preheating rod having one end protruding to the combustion chamber to selectively preheat the combustion chamber;
    a bellows pipe enclosing the preheating rod to maintain an air-tightness of an area where the preheating rod is inserted to the combustion chamber;
    a piezo element selectively pulling or pushing another end of the preheating rod; and
    a controller controlling deformation of the piezo element and preheating of the combustion chamber through the preheating rod.

2. The glow plug of claim 1, wherein:
    the preheating rod is formed of a metal material to preheat the combustion chamber by receiving a current.

3. The glow plug of claim 1, wherein:
    the bellows pipe is formed of an elastic material to close the area where the preheating rod is inserted to the combustion chamber.

4. The glow plug of claim 1, wherein:
    the piezo element is deformed depending on a voltage applied to the piezo element.

5. The glow plug of claim 4, wherein:
    if the controller decreases the voltage applied to the piezo element, the piezo element expands and reaches the another end of the preheating rod so that the one end of the preheating rod is protruded to the combustion chamber.

6. The glow plug of claim 5, wherein:
    the bellows pipe maintains an air-tightness while being contracted.

7. The glow plug of claim 5, wherein:
    the controller applies a current to the preheating rod, and the combustion chamber is preheated.

8. The glow plug of claim 4, wherein:
    if the controller increases the voltage applied to the piezo element, the piezo element is contracted to pull the another end of the preheating rod so that the one end of the preheating rod is detached outside the combustion chamber.

9. The glow plug of claim 8, wherein:
    the controller releases the current applied to the preheating rod.

10. The glow plug of claim 8, wherein:
    the bellows pipe maintains the air-tightness while being expanded.

11. The glow plug of claim 1, further comprising:
    an insulating member disposed on a circumference of the piezo element to insulate the piezo element from a surroundings.

12. A control method of a glow plug including a preheating rod selectively protruding to a combustion chamber to preheat the combustion chamber of an engine and a piezo element deformed to pull or push the preheating rod comprising:
    measuring a temperature of a coolant, a temperature of an intake, and an outlet temperature of a turbine;
    protruding the preheating rod to the combustion chamber; and
    detaching the preheating rod outside the combustion chamber.

13. The control method of claim 12, wherein:
    the control method starts at a Key On of the vehicle.

14. The control method of claim 12, wherein:
    the control method is finished at a Key Off of the vehicle.

15. The control method of claim 12, wherein:
    if any one of the temperature of the coolant, the temperature of the intake, and the outlet temperature of the turbine does not reach each predetermined temperature, the preheating rod is protruded to the combustion chamber depending on a deformation of the piezo element.

16. The control method of claim 15, wherein:
    if the glow plug is protruded to the combustion chamber, a current is applied to the preheating rod such that the combustion chamber is preheated.

17. The control method of claim 12, wherein:
    if all of the temperature of the coolant, the temperature of the intake, and the outlet temperature of the turbine reach each predetermined temperature, the preheating rod is detached outside the combustion chamber depending on a deformation of the piezo element.

* * * * *